United States Patent [19]

Usui

[11] Patent Number: 4,946,174
[45] Date of Patent: Aug. 7, 1990

[54] ANNULAR METAL GASKET

[75] Inventor: Masayoshi Usui, Numazu City, Japan

[73] Assignee: Usui Kokusai Sangyo Kaisha, Ltd., Sunto, Japan

[21] Appl. No.: 160,264

[22] Filed: Feb. 25, 1988

[51] Int. Cl.$^5$ .............................................. F16J 15/00
[52] U.S. Cl. ................... 277/199; 277/206 R; 277/236
[58] Field of Search ............... 277/206, 236, 200, 198, 277/199, 192

[56] References Cited

U.S. PATENT DOCUMENTS

| | | | |
|---|---|---|---|
| 3,163,431 | 12/1964 | Tanner | 277/206 R |
| 3,820,799 | 6/1974 | Abbes et al. | 277/236 X |
| 4,079,949 | 3/1978 | McCormick | 277/200 X |
| 4,218,067 | 8/1980 | Halling | 277/236 X |
| 4,361,335 | 11/1982 | Vinciguerra | 277/206 R X |
| 4,561,662 | 12/1985 | DeVillepoix et al. | 277/236 X |

Primary Examiner—Harvey C. Hornsby
Assistant Examiner—Mark Spisich
Attorney, Agent, or Firm—Anthony J. Casella; Gerald E. Hespos

[57] ABSTRACT

This invention provides an annular metal gasket having an improved structure which is generally used in various kinds of machinery, equipment, apparatus and the like as a sealing means to be fitted in a groove or similar, wherein the degree of the elastic fatigue caused by the pressure applied to the gasket can be reduced, The fatigue limit can be raised, and the sealing performance can be assured, while any difficulty in reusing the gasket after the overhaul being eliminated. An annular metal gasket according to the present invention comprises an annulus with a gap in its outer periphery and an endless groove with a substantially C-shaped cross-section, and a resilience control member which is inserted in this gap and is engagingly supported on both edges of the gap in the annulus. Further, an annular metal gasket according to the present invention comprises an annulus formed of a plurality of different materials which are aggregated together and also is a resilience control member which is divided into a plurality of pieces and inserted in the gap in the annulus.

8 Claims, 1 Drawing Sheet

PRIOR ART

ANNULAR METAL GASKET

BACKGROUND OF THE INVENTION

1. Field of the Invention

This invention relates to an annular metal gasket having an improved structure which is generally used in various kinds of machinery, equipment, apparatus and the like as a sealing means to be fitted in a groove or similar.

2. Description of the Prior Art

Conventionally, this kind of annular metal gasket has been comprised of an annulus with an endless hollow 11 therein which is composed of a thin-walled, elastic metal tube, as illustrated in FIG. 5. However, in the conventional-type annular metal gasket, the resilience of the gasket is subject to deterioration with respect to the elastic fatigue of the gasket which occurs when used under pressure, whereby the sealing performance tends generally to deteriorate in a short period of time, resulting in such problems as the difficulty of reusing the gasket after the overhaul.

SUMMARY OF THE INVENTION

An object of the present invention is to provide an annular metal gasket which reduces the degree of elastic fatigue experienced by such a gasket in use under pressure, raises the fatigue limit, and ensures an adequate sealing performance, while eliminating any difficulty in reusing the gasket after the overhaul.

The present invention aims to provide an annular metal gasket which comprises an annulus with a gap in its outer periphery and an endless groove with a substantially C-shaped cross-section, and a resilience control member which is inserted in this gap and is engagingly supported on both edges of the gap in the annulus. Further, an annular metal gasket according to the present invention comprises an annulus formed of a plurality of different materials which are aggregated together and also a resilience control member which is divided into a plurality of pieces and inserted in the gap in the annulus.

DETAILED DESCRIPTION OF THE PREFERRED EMBODIMENTS

Figure 1:
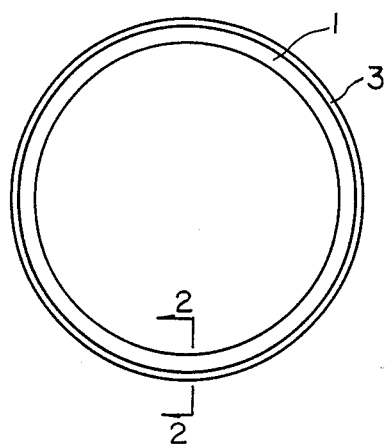
FIG. 1 is a plan view of an embodiment of an annular metal gasket of an embodiment according to the present invention.
Figure 2:
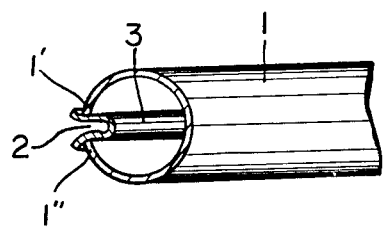
FIG. 2 is a partially enlarged, sectional view of an embodiment according to the present invention, which is taken along the line 2—2 shown in FIG. 1.

An embodiment according to the present invention will be described with reference to the accompanying drawings: in which numeral 1 denotes an annulus which has a gap 2 formed in its outer periphery and disposed in which is an endless groove with a C-shaped cross-section which is formed of an elastic sheet metal such as stainless steel, spring steel, Inconel or aluminum; and reference numeral 3 denotes a resilience control member which preferably has an Ω-shaped cross-section and is formed of an elastic metal sheet such as stainless steel, spring steel, or Inconel, which is inserted and fitted between edges 1' and 1" at each side of the gap 2 in the annulus 1, the resilience control member may be inserted such that the free open end thereof faces either outwardly or inwardly of the annulus 1, as shown respectively in FIGS. 2 and 4. In each illustrated embodiment, the resilience control member 3 includes a first portion fitted on and supported by both edges 1' and 1" at each side of the gap 2, a second portion disposed within the groove of the annulus 1 and a third portion disposed radially outwardly from the annulus 1.

Figure 3:
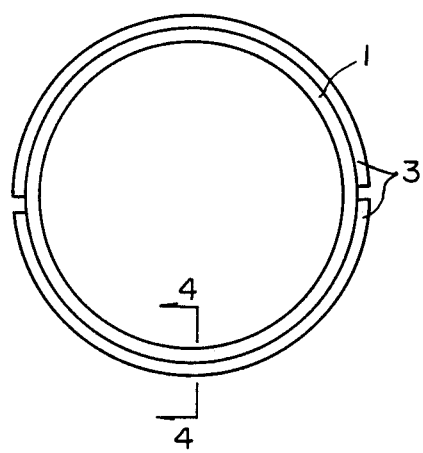
FIG. 3 is a plan view of another embodiment of an annular metal gasket according to the present invention.
Figure 4:
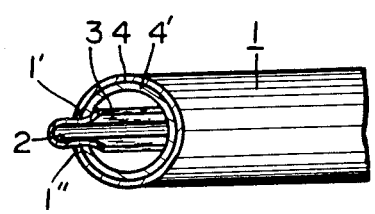
FIG. 4 is a partially enlarged, sectional view taken along the line 4—4 shown in FIG. 2.
Figure 5:
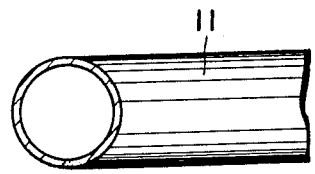
FIG. 5 is a partially enlarged, longitudinal sectional view of an embodiment according to a prior art.

As illustrated in FIG. 4, the annulus 1 may also be comprised of an outer annulus 4 and an inner annulus 4' which is disposed on the inside face of the outer annulus 4, wherein the outer annulus 4 may be comprised of a metal with sealing characteristics or the inner annulus 4' may be comprised of a metal with a spring action. The resilience control member 3 may be comprised of a plurality of pieces which are divided as shown in FIG. 3 and inserted in the gap 2 in the annulus 1.

Since an annular metal gasket according to the present invention is comprised in such a manner that the resilience control member 3 is inserted in the gap 2 which is formed in the outer periphery of the annulus 1, the pressure during the use of the gasket fitted on the groove can be rationally absorbed while at the same time the resilience which is effected by the annulus 1 and resilience control member 3 will be achieved.

As have been described above, an annular metal gasket according to the present invention is considerably useful and can be rendered to reusing after the overhaul, because in using the gasket the degree of the elastic fatigue is reduced and the fatigue limit is improved by virtue of the pressure control function which is effected by the space 2 and the synergetic resilience which is effected by the annulus 1 and the resilience control member 3, thereby resulting in the sufficiency of the sealing performance.

What is claimed is:

1. An annular metal gasket comprising:
   an annulus having an endless groove formed in the outer periphery thereof, said groove defining a narrow gap at said outer periphery and defining dimensions larger than said gap at locations in said groove radially inwardly from said gap, such that said annulus defines a generally C-shaped cross-section; and
   a resilience control member of generally omega-shaped cross-section which is inserted in said gap said resilience control member comprising a first portion fitted on and supported by both edges of said annulus defining said gap, a second portion disposed in the larger dimension portion of the groove in said annulus, and a third portion disposed radially outwardly from the annulus.

2. A gasket according to claim 1, wherein said annulus comprises at least two or more number of different materials which are substantially of the same shape.

3. A gasket according to claim 1, wherein said resilience control member is divided into at least two parts to enable said control member to be inserted in said gap.

4. A gasket according to claim 1, wherein said resilience control member comprises stainless steel, spring steel, or Inconel.

5. A gasket according to claim 1, wherein said annulus comprises an elastic metal which includes stainless steel, spring steel, or aluminum.

6. A gasket according to claim 2, wherein said annulus comprises an outer annulus formed of a metal having sealing characteristics and an inner annulus formed of a metal having a spring action which are aggregated together.

7. A gasket according to claim 1 wherein said omega-shaped cross-section of said resilience control member defines a pair of opposed edges, said opposed edges being disposed radially outwardly from said annulus.

8. A gasket according to claim 1 wherein said omega-shaped cross-section of said resilience control member defines a pair of opposed edges, said opposed edges being disposed in the larger dimension portion of the groove in said annulus.

* * * * *